(12) United States Patent
Kinn et al.

(10) Patent No.: US 7,063,917 B2
(45) Date of Patent: Jun. 20, 2006

(54) LAMINATED BATTERY SEPARATOR MATERIAL

(75) Inventors: Larry L. Kinn, East Longmeadow, MA (US); Clement J. Haley, Mifflinburg, PA (US); Gregory N. Henning, Salem, SC (US)

(73) Assignee: Ahlstrom Mount Holly Springs, LLC, Mount Holly Springs, PA (US)

( * ) Notice: Subject to any disclaimer, the term of this patent is extended or adjusted under 35 U.S.C. 154(b) by 250 days.

(21) Appl. No.: 10/080,199

(22) Filed: Feb. 19, 2002

(65) Prior Publication Data

US 2002/0160259 A1 Oct. 31, 2002

Related U.S. Application Data

(60) Provisional application No. 60/270,483, filed on Feb. 21, 2001.

(51) Int. Cl.
*H01M 2/16* (2006.01)
*D04H 5/08* (2006.01)
*B32B 5/22* (2006.01)
*B32B 27/32* (2006.01)
*B01D 39/00* (2006.01)

(52) U.S. Cl. .................. 429/250; 429/254; 442/361; 442/364; 442/381; 442/389; 55/486; 210/483

(58) Field of Classification Search .......... 429/144, 429/141, 129, 254, 250, 121; 428/323, 354; 442/394, 398, 400–402, 381, 389, 396; 55/486; 210/348, 483
See application file for complete search history.

(56) References Cited

U.S. PATENT DOCUMENTS 3,186,876 A 6/1965 Piechon
3,344,013 A 9/1967 Fahrbach
3,615,865 A 10/1971 Wetherell
3,870,567 A 3/1975 Palmer
3,978,185 A 8/1976 Buntin et al.
4,078,124 A 3/1978 Prentice
4,165,352 A 8/1979 Volkman
4,220,693 A 9/1980 Di Palma et al.
4,230,549 A 10/1980 D-Agostino et al.
4,273,840 A 6/1981 Machi et al.
4,288,503 A 9/1981 Goldberg (Continued)

FOREIGN PATENT DOCUMENTS

EP 480724 A1 * 4/1992

(Continued)

OTHER PUBLICATIONS

PATENT ABSTRACT—Database WPI, Section Ch, Week 199919, Derwent Publications Ltd., London, GB; AN 1999-220356, XP002215618 & JP11 054101 A (Mitsubishi Paper Mills Ltd.), Feb. 26, 1999.

(Continued)

*Primary Examiner*—Gregg Cantelmo
(74) *Attorney, Agent, or Firm*—Ostrager Chong Flaherty & Broitman P.C.

(57) ABSTRACT

A nonwoven material having a laminated construction and including a first layer of nonwoven fibers defining a first surface of the material; a second layer of nonwoven fibers defining the opposite surface of the material; and a third layer of nonwoven fibers located between the first and second layers. The layers are bonded together to form a laminate. At least one of the nonwoven layers comprises a nonwoven web of meltblown fibers. Additionally, one or more of the layers has been rendered permanently hydrophilic by forming the nonwoven web from meltspun fibers of a normally hydrophobic polymer having a hydrophilic melt additive incorporated therein.

19 Claims, 1 Drawing Sheet

U.S. PATENT DOCUMENTS

| | | | |
|---|---|---|---|
| 4,440,838 A | 4/1984 | Schmidt | |
| 4,578,414 A | 3/1986 | Sawyer et al. | 524/310 |
| 4,594,202 A | 6/1986 | Pall et al. | |
| 4,650,730 A | 3/1987 | Lundquist et al. | |
| 4,657,807 A | 4/1987 | Fuerstman | |
| 4,789,609 A | 12/1988 | Ambrose-Ritchey et al. | |
| 4,880,548 A | 11/1989 | Pall et al. | |
| 5,145,727 A * | 9/1992 | Potts et al. | 428/198 |
| 5,180,647 A | 1/1993 | Rowland et al. | |
| 5,202,178 A | 4/1993 | Turner | |
| 5,204,165 A * | 4/1993 | Schortmann | 428/198 |
| 5,281,491 A | 1/1994 | Rein et al. | |
| 5,342,708 A | 8/1994 | Green et al. | |
| 5,439,734 A * | 8/1995 | Everhart et al. | 442/400 |
| 5,492,781 A | 2/1996 | Degen et al. | |
| 5,547,779 A | 8/1996 | Kishimoto et al. | |
| 5,582,904 A | 12/1996 | Harrington | 428/224 |
| 5,614,574 A | 3/1997 | Sheth | 524/140 |
| 5,667,911 A | 9/1997 | Yu et al. | |
| 5,691,047 A | 11/1997 | Kurauchi et al. | |
| 5,691,077 A | 11/1997 | Yu | |
| 5,804,512 A * | 9/1998 | Lickfield et al. | 442/346 |
| 5,883,026 A | 3/1999 | Reader | |
| 5,939,222 A | 8/1999 | Senyarich et al. | |
| 5,952,120 A | 9/1999 | Yu et al. | |
| 5,962,161 A | 10/1999 | Zucker | |
| 6,008,145 A | 12/1999 | Dzen et al. | |
| 6,057,061 A | 5/2000 | Callahan et al. | |
| 6,080,507 A | 6/2000 | Yu | |
| 6,120,939 A | 9/2000 | Whear et al. | |
| 6,384,100 B1 * | 5/2002 | Choi | 522/46 |
| 2001/0008965 A1 | 7/2001 | Kinn et al. | |

FOREIGN PATENT DOCUMENTS

| | | |
|---|---|---|
| EP | 0 591 616 B1 | 4/1994 |
| EP | 709499 A1 * | 5/1996 |
| EP | 0 795 916 A1 | 9/1997 |
| JP | 07163819 A * | 6/1995 |
| JP | 09 223492 | 8/1997 |
| WO | WO 98/31060 | 7/1998 |
| WO | WO 98/35829 | 8/1998 |
| WO | WO 00/41254 | 7/2000 |

OTHER PUBLICATIONS

PATENT ABSTRACT—Database WPI, Section Ch, Week 199744, Derwent Publications Ltd., London, GB; AN 1997-477216, XP002215619 & JP09 223492 A (Daiwabo Co. Ltd.), Aug. 26, 1997.

* cited by examiner

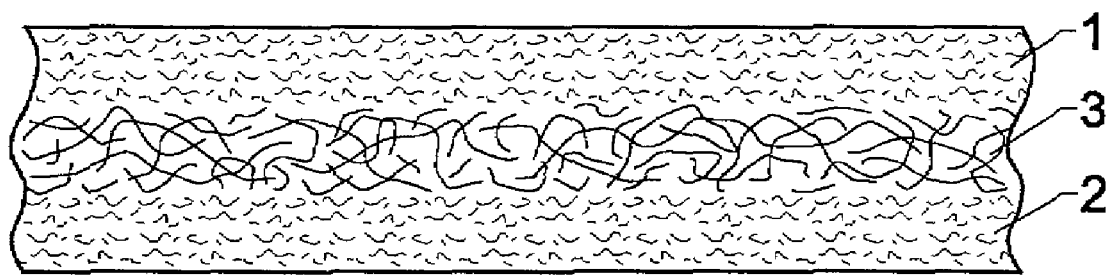

LAMINATED BATTERY SEPARATOR MATERIAL

RELATED APPLICATION

This application claims the benefit of U.S. Provisional Application No. 60/270,483 filed Feb. 21, 2001.

FIELD OF THE INVENTION

The present invention relates to a nonwoven material suitable for use as a battery separator. More particularly, the invention is directed to a nonwoven material formed from a laminate of nonwoven webs.

BACKGROUND OF THE INVENTION

Various kinds of battery constructions utilize a porous battery separator material disposed between the battery electrodes for positioning the electrodes in a spaced apart relationship and to maintain the battery electrolyte in contact with the electrodes. For example, one known construction consists of a wound anode interleaved with a wound cathode, with the wound anode and cathode being spaced apart from one another by a nonconductive porous separator material which is impregnated with electrolyte. Various battery separators have been produced from nonwoven webs of fibrous materials. For example, Williams et al. U.S. Pat. No. 6,174,826 describes a nonwoven battery separator material which is formed from a blend of polypropylene staple fibers and polyethylene/polypropylene sheath/core bicomponent fibers. Published PCT Application WO 00/41254 describes a nonwoven battery separator material which includes thermoplastic polymeric fibers blended with a hydrophilic melt additive.

Although nonwoven webs of this type offer many advantageous features, the need exists for greater control over the uniformity, strength, dimensional stability, electrolyte transport properties and other characteristics of a nonwoven battery separator. For example, it is important that the battery separator have uniformity in thickness and basis weight, avoiding holes or thin areas that could produce short circuits or variations in the resistance or other electrical properties.

SUMMARY OF THE INVENTION

The present invention provides a material having a laminated construction formed of multiple nonwoven web layers. The material has utility as a battery separator material. The laminated battery separator material of the present invention comprises a first layer of nonwoven fibers defining a first surface of the battery separator; a second layer of nonwoven fibers defining the opposite surface of the battery separator; and a third layer of nonwoven fibers located between the first and second layers. The layers are bonded together to form a laminate. At least one of the nonwoven layers comprises a nonwoven web of meltblown fibers. Additionally, one or more of the layers has been rendered permanently hydrophilic by forming the nonwoven web from fibers of a normally hydrophobic polymer having a hydrophilic melt additive incorporated therein.

Preferably, at least one of the nonwoven web layers of the laminate contains binder fibers having a melting or fusing point lower than the fibers of the other layers. The binder fibers of this layer can be activated by heating so as to bond the layers of the laminate together while preserving the integrity of the other layers.

Preferably, at least the web formed of meltblown fibers is made from a normally hydrophobic polymer having a durable hydrophilic melt additive incorporated therein. The hydrophilic melt additive may comprise at least one member selected from the group consisting of monomer or dimer fatty acids having a carbon chain length in the range of 6 to 50, hydroxy phenols, polyethylene glycol, polyvinyl alcohol, and polyvinyl formal. One or more of the other layers of the separator may also be made permanently hydrophilic in this manner.

The nonwoven webs used in the laminated battery separator may be formed by various processing techniques known in the nonwovens industry. For example, the webs may comprise an air-laid web of staple fibers, a carded web of staple fibers, a wet-laid web of staple fibers, a web of meltblown fibers or a spunbonded web of substantially continuous filaments. The various nonwoven layers may be arranged in various configurations to provide the desired mechanical, electrical and electrolyte transport properties.

For example, in one specific embodiment, the laminated battery separator material comprises a first layer formed of meltblown nonwoven fibers defining a first surface of the battery separator; a second layer formed of nonwoven fibers defining the opposite surface of the battery separator; and an intermediate third layer of wet-laid nonwoven fibers located between said first and second layers and bonded to said first and second layers to form a laminate. At least one of the first and third layers comprises permanently hydrophilic fibers formed of a normally hydrophobic polypropylene polymer having a hydrophilic melt additive incorporated therein. In one preferred specific embodiment, both outer layers of the laminated battery separator material are formed of meltblown nonwoven fibers formed of a normally hydrophobic polypropylene polymer having a hydrophilic melt additive incorporated therein. In another preferred specific embodiment, the first layer is formed of meltblown fibers containing a hydrophilic melt additive, so that this surface of the separator is hydrophilic and promotes wicking and retention of the electrolyte, and the opposite surface of the separator is hydrophobic and is formed from meltblown fibers of a normally hydrophobic polymer. Between the two outer meltblown layers, there is provided a bonding layer, preferably a wet-laid nonwoven formed of staple fibers, at least some of which are formed of or contain a relatively lower melting polymer so as to function as binder fibers. The fibers of this layer may be hydrophobic, permanently hydrophilic, or a blend of hydrophobic and hydrophilic fibers.

Other exemplary constructions include a wet-laid-meltblown-carded laminate; a meltblown-spunbond-wet-laid laminate; a meltblown-wet-laid-carded laminate, a meltblown-wet-laid-wet-laid laminate and a wet-laid-meltblown-wet-laid laminate. The separator material can also contain more than three layers. At least one of the outer layers is rendered permanently hydrophilic by incorporating into a normally hydrophobic polyolefin polymer, at least one hydrophilic melt additive.

The nonwoven webs used in the laminated battery separator of the present invention may include multicomponent fibers which include a first component formed of a hydrophobic polypropylene and a second component formed of a blend of a hydrophobic polyolefin and a hydrophilic melt additive. This second component is disposed at the surface of the fibers. The hydrophilic melt additive-modified polyolefin component can be arranged in various configurations in the cross-section of the fiber and the fibers can have various cross-sections. For example, the hydrophilic component can occupy a portion of the surface of the fiber, as would occur for example with a side-by-side or segmented pie multicomponent fiber cross-sectional configuration.

There are various melt additives available which can be melt blended with a hydrophobic polyolefin composition to impart durable hydrophilic properties to the polyolefin. Melt additives suitable for the present invention must not undesirably alter the melt-spinability of the multicomponent fibers and should be relatively compatible with the polyolefin composition such that the additive will not prematurely leach out and lose the hydrophilic properties. Certain suitable melt additives useful in the present invention will be at least partially immiscible with the polyolefin polymer composition and will tend to bloom to the fiber surface over time or with application of heat to impart a prolonged hydrophilic surface modification. Particularly suitable are compounds with a molecular structure which includes at least one functional group which is tethered to the olefin polymer structure, with other functional groups which provide reactive hydrophilic sites. Suitable hydrophilic melt additives for use in the present invention include monomer or dimer fatty acids, hydroxy phenols, polyethylene glycol, fluorohydrocarbons, polyvinyl alcohol and polyvinyl formal.

One particularly suitable class of melt additives is an admixture of hydroxy phenols and polyethylene glycols. The hydroxy phenol is characterized in that it contains the functional group $HOC_6H_4$—.

Another particularly suitable class of melt additives are monomer and dimer fatty acids having a carbon chain length in the range of 6 to 50, preferably 18 to 36.

According to one embodiment of the invention, the nonwoven web is fabricated employing wet laid and/or carded thermal bonding processes. It is possible to use combinations of hydrophobic and hydrophilic fibers in the web. In other words, all fibers in the web need not be permanently wettable.

In one specific preferred embodiment, the web includes bicomponent fibers in which the melt additive is incorporated into the sheath constituent of the fiber. Use of bicomponent fibers, as well as combinations of hydrophobic and hydrophilic fibers, reduces costs and permits optimization of the web for diverse applications. In another of the embodiments of the present invention, the wettable fibers are blended with non-wettable binder fibers. Preferably these binder fibers are polyethylene/polypropylene bicomponent fibers having a polyethylene sheath and a polypropylene core. In still another embodiment of the invention, the nonwoven web includes both non-wettable binder fibers and wettable binder fibers. The wettable binder fibers are preferably polyethylene/polypropylene bicomponent fibers where the hydrophilic melt additive is incorporated into the polyethylene sheath of the bicomponent fiber. The non-wettable binder fibers may comprise polyethylene/polypropylene bicomponent fibers. In yet another embodiment, the nonwoven web is formed substantially entirely of wettable binder fibers of the type described.

In general, laminated battery separator materials of the invention have enhanced wetability and strength and provide good permeability to gases. More particularly, the laminated materials of the present invention can provide the very fine average pore sizes and bubble points (largest pore measurement) desired in many kinds of battery separators which maintaining excellent burst strength, tensile strength and dimensional stability. The laminates also provide the capability of imparting a gradient wettability to the material for better control over the wetting characteristics. For example, for certain end-use applications, the laminated material can have wettability on one surface and barrier properties on the opposite The invention also includes the related process for making laminated nonwoven material which can be used as a battery separator which require durability and wettability. In general, wettable fibers with at least one hydrophilic melt additive are produced and formed into a nonwoven web by meltblowing, spunbonding other nonwoven formation methods. In one embodiment the fibers are further mixed with binder fibers which are then laid on a papermaking machine to form a wet-laid web. The water is removed from the wet-laid web, thermal bonded and calendered to form the nonwoven.

The laminated nonwoven materials of the present invention have particular utility as battery separator materials. However, the materials also can be advantageously employed in other end uses. For example, in the field of filtration, the various web layers can be selected to produce filtration media with various desired fluid transport and separation characteristics.

BRIEF DESCRIPTION OF THE DRAWING

Some of the features and advantages of the invention having been generally described, others will become apparent from the description which follows, and from the accompanying drawing, in which:

The FIGURE is a schematic cross-sectional view illustrating a laminated nonwoven material in accordance with the present invention.

DETAILED DESCRIPTION

The present invention will be described more fully hereinafter with reference to the accompanying drawing, in which one specific embodiment of the invention is shown. This invention may, however, be embodied in many different forms and should not be construed as limited to the embodiments illustrated or described herein; rather, these embodiments are provided so that this disclosure will be thorough and complete, and will fully convey the scope of the invention to those skilled in the art.

The hydrophilic melt additives are incorporated into the thermoplastic olefin polymer and are converted into a nonwoven web using any of various forming technologies available for the production of nonwoven webs. The material can be converted directly from the polymer into a nonwoven web by spunbonding or meltblowing or a combination of the two. Alternatively, the material may be first formed into fibers and the fibers may thereafter be converted into a nonwoven web by techniques such as wet-laying, air-laying or carding. By combining the melt additives and the nonwoven process, a durably hydrophilic nonwoven web is produced.

In one embodiment of the invention, the hydrophilic melt additives are blended with polypropylene and formed into multicomponent staple fibers to form a wettable fiber matrix. This matrix is then further combined with non-wettable binder fibers and wet-laid to form one of the layers of the nonwoven material of the invention. The non-wettable binder fibers used may include a bicomponent fiber comprising a polyethylene sheath and a polypropylene core, available as Chisso fibers from Chisso, Japan. The nonwoven material formed has both discrete hydrophobic and hydrophilic regions due to the different types of fibers used in making the web.

In an alternate embodiment the hydrophilic melt additives are blended with bicomponent fibers comprising a polypropylene sheath and a polypropylene core to form the wettable fiber matrix. The bicomponent sheath/core fiber proportions used in the invention may vary over a wide range, with from 50/50 sheath/core to 60/40 sheath/core being exemplary. Essentially the melt additives are incorporated into the outer sheath of the fibers. Use of bicomponent fibers having 60/40 sheath/core permit higher incorporation of the melt additive into the sheath portion. The wettable fibers may be then further combined with non-wettable binder fibers to form the nonwoven web.

In all embodiments, the durable hydrophilic web is manufactured by blending a concentrate of hydrophilic melt additives with the thermoplastic polymer and converting the polymer into fibers, and into a nonwoven web directly or through an intermediate fiber formation process. The type of melt additive and proportion can be varied as required to control the wettability of the particular nonwoven web layer.

In one embodiment, the melt additives used in the invention are selected from the group consisting of monomer and dimer fatty acids having a carbon chain length in the range of 6 to 50, preferably 36. In a preferred composition of this embodiment, the blend contains 2 to 15% Acintol® tall oil fatty acid, Acintol® distilled tall oils (monomer acids) and Sylvadym® dimer acids, which are all commercially available from Arizona Chemical Company, Panama City, Fla. and are fully described in the Technical Data Sheets for these materials, which are incorporated herein by reference. These are polar liquid materials which migrate to the surface of the polyolefin and remain as liquid on the surface thereof. Uniform mixing of the components is important to achieve effective hydrophilic properties. In another embodiment, the hydrophilic melt additives are fluorohydrocarbons, such as 3M FC 1296.

In another embodiment, the melt additives used in the invention are an admixture of hydroxy phenols and polyethylene glycols. Examples of melt additives used are commercially available from Techmer PM, California under the product designations PPM 11211, PPM 11249, PPM 11212, PPM 11267 and PPM 11268. This active or functional chemical is provided in a carrier resin, preferably polyolefin such as polypropylene or polyethylene, of a given melt flow rate (MFR) suitable for meltblowing, spunbonding or staple fiber manufacture. Accordingly, the formulations have different melt flow rates depending on the end use applications. The MFR listed in the formulations below were measured at 230° C., 2.16 kg. Melt blown grade polypropylene resins typically have a much higher melt flow rate (MFR 800–1200), whereas spunbond and staple fiber grade polypropylene resins have a lower melt flow rate (MFR 7–35). The base chemicals in the formulations include durable hydrophilic materials or non-durable hydrophilic materials depending on the desired wettability properties and end use applications. The non-durable hydrophilic materials provide initial wetting of the fibers to enhance and maximize incorporation of the durable hydrophilic materials. The durable hydrophilic materials impart the wettability and strength properties to the fiber materials.

For melt blown nonwoven structures, the fiber-forming polymer suitably contains from about 1% to about 20% by weight of the active durable hydrophilic additive. For spunbond webs and nonwoven webs containing staple fibers, the fibers can suitably contain from about 1% to about 15% by weight of the active durable hydrophilic additive. A small proportion of a non-durable hydrophilic additive may optionally also be included. The hydrophilic melt additives can be used in the following exemplary forms of nonwovens, namely meltblown, spunbond, wet-laid, dry-laid or a combination of these forms. Fiber deniers for melt blown structures typically range from 0.1 to 2.0 deniers, with less than 1.0 most preferred. In the case of staple fiber and spunbond filaments deniers, fiber deniers of less than 3.0 are used, but less than 2.0 are most preferred.

The fibers can be produced by blending the unmodified hydrophobic polyolefin resin, in chip or flake form as supplied by the resin supplier, with a melt additive masterbatch formulation which contains the active hydrophilic melt additive chemical in a polyolefin resin carrier. The following are exemplary melt additive masterbatch formulations:

Melt Additive 1 contains approximately 30% by weight of a durable active hydrophilic chemical with the balance being polypropylene, and is a commercially available composition sold as PPM 11211 from Techmer PM, California.

Melt Additive 2 contains approximately 30% by weight of a non-durable hydrophilic active chemical, with the balance being polypropylene, and is a commercially available composition sold as PPM 11212 from Techmer PM, California.

Melt Additive 3 contains approximately 25% of the same durable hydrophilic materials as in Melt Additive formulation 1. This additive has a MFR of 54 grams/10 minutes and is commercially available as PPM 11267 from Techmer PM.

Melt Additive 4 contains approximately 20% of the active chemical and includes the same non-durable hydrophilic materials as in Melt Additive formulation 2. This additive has a MFR of 109 grams/10 minutes and is commercially available as PPM 11268 from Techmer PM, California.

EXAMPLES

To understand the present invention more fully, several illustrative examples of the invention are described below. These examples are for purposes of illustration only and this invention should not be considered to be limited by any recitation used therein. The examples demonstrate the preparation of various laminated nonwoven materials in accordance with the present invention.

Test Procedures:

In the examples below, unless otherwise specified, the following test procedures were used:

Air Permeability. Air Permeability was measured in accordance with ASTM Test Method D737–96.

Tensile Strength. Machine direction (MD) and cross-machine direction (CD) tensile strength were measured an accordance with ASTM Procedure D5035.

Wicking. Wicking refers to the ability of a fabric to absorb a liquid through capillary action. Wicking values are obtained by determining the distance a solution of potassium hydroxide (KOH) is absorbed (wicked) by a fabric specimen held vertically. Specifically, three (3) specimens from each sample are cut 1 inch CD×7 inch MD (2.54 cm×17.8 cm). The specimens are conditioned by drying in an oven at 70° C. (158° F.) for 1 minute, removed from the oven, and conditioned to the lab environment for 15 minutes prior to testing. Each specimen of the fabric is suspended vertically in a 31% solution of KOH and the distance the liquid is absorbed by the specimen is measured after 30 minutes.

The 31% KOH solution was prepared as follows: Ingredients: Distilled water and potassium hydroxide pellets (KOH). Procedure: The distilled water is freed of dissolved carbon dioxide by boiling and covering with a watch glass. The boiled water is allowed to cool to room temperature.

The solution should be 31% KOH by weight. Since solid KOH contains approximately 10% water, 34.5 g of solid KOH is used for every 100 g of solution required. The solution is made by slowly adding the 34.5 g of KOH to 65.5 g of water.

Bubble Point and Mean Pore Size. The mean pore size and bubble point (maximum pore size) measurements are from a Porous Materials Inc (PMI) Automated Capillary Flow Porometer. The company is located at 83 Brown Road, Ithaca, N.Y. 14850. The test method used is the standard supplied by the manufacturer.

Absorbency Under Pressure. Die cut 20 layers of fabric into 1 inch (2.54 cm) diameter circles. Stack the 20 circular samples, place in a heat-sealable plastic pouch and place the pouch assembly between two square plexiglass plates that can be tightened with bolts/wing-nuts on each of the four corners. Add sufficient 31% KOH to the pouch to saturate the samples and soak for 5 minutes, then drain the excess KOH. Vacuum fill the assembly two times to remove any trapped air and completely saturate the samples. Again drain any excess KOH. Weigh the sample and measure thickness after the 5-minute soak and after the second vacuum. Compress the assembly to 50 psi (345 kPa), adjust wing-nuts to maintain compression, drain excess KOH and then heat-seal the open end of the plastic pouch. Place the entire assembly in an oven at 60° C. for a minimum of 3 hours. Allow to cool, cut open bag and drain excess KOH. Compress assembly to 100 psi (690 kPa) and again adjust wing-nuts to maintain compression. Drain excess KOH. Measure weight and thickness of assembly after 50 psi compression, after 3+ hour heat treatment and after 100 psi compression. Calculate the absorbency at 100 psi in g/cc=grams of KOH absorbed at 100 psi /(thickness of 20 layers at 100 psi×area of the 2.54 cm diameter sample).

Hi Pot. Place rectangular fabric sample approximately 2⅝ inch×3¼ inch (6.7 cm×8.3 cm) between two aluminum test plates. Compress sample to 50 psi (345 kPa). Apply electrical potential across plates and increase voltage steadily until electrical arc occurs. Report voltage at which arcing begins. Measure 20 samples and report average voltage.

Ionic Resistance. Cut twenty one inch (2.54 cm) diameter samples from the sheet. Place in heat sealable pouch, cover with 31% KOH solution and seal pouch. Heat in 60° oven for 3 hours, cool for one hour before testing. Stack a 1" diameter Ni disk+1" diameter metal hydride electrode disk+ two 1" diameter separator samples (add few drops of 31% KOH)+1" metal hydride electrode disk+1" diameter nickel disk. Compress the assembly with a 50 psi (345 kPa) load. Measure the impedance between the two nickel disks using an Agilent Impedance Meter (Model HP4338B). Add two more fabric sample disks and measure the impedance with 4 layers of separator. Continue testing two additional layers at a time until all 20 layers are tested. Plot the measured impedance versus the number of layers. Calculate ionic resistance (ohm-cm)=slope×area of 1 inch diameter sample/thickness of 1 sample layer under compression.

Preparation of Nonwoven Webs

The nonwoven webs used in the laminated wettable battery separator materials described in Table 1 below were prepared as follows:

Meltblown webs having an average fiber diameter of 1 to 5 μm, preferably 1 to 2 μm are produced by blending polypropylene resin flake with the following masterbatch compositions: 2½ percent of the nondurable hydrophilic Melt Additive 2 and 20 percent of the durable hydrophilic Melt Additive 1. Thus, the fibers contain 6 percent of the active durable hydrophilic melt additive.

Wet-laid webs are produced from a blend of durably hydrophilic bicomponent fibers and unmodified, hydrophobic bicomponent fibers. The hydrophilic bicomponent fibers are 16.6 μm diameter fibers ½ inch (1.3 cm) staple length, and of a 50/50 sheath/core configuration, including a polyethylene sheath and a polypropylene core. The polyethylene sheath component contains 20% by weight of the durable hydrophilic Melt Additive 3 and 2½% of Melt Additive 4. The non-modified hydrophobic fibers are 17.5 μm diameter, 10 mm staple length fibers which are 50/50 concentric sheath/core polyethylene/polypropylene bicomponent fibers.

The carded thermal bond webs are produced from hydrophobic polypropylene fibers 1½ denier, 15 μm diameter, 1½ inch (3.8 cm) staple length.

The spunbond webs are produced from hydrophobic polypropylene filaments 15–20 μm in diameter.

The netting is produced from polypropylene strands 100–150 μm in diameter.

The nylon web is form from a blend of 10 μm and 19 μm nylon 6 fibers.

The various separately produced webs were arranged in stacked relation and directed through a heated calender equipped with smooth rolls to form laminates. The nip pressure and roll temperature and speed are adjusted to provide sufficient heat to activate the polyethylene component of the fibers so as to effect bonding without overly affecting the structure of the other web layers. An exemplary roll temperature for bonding polyethylene is 225° F. (107° C.). The physical properties of the laminates were measured, and are reported in Table 1.

TABLE 1

Trilaminate Physical Data & Description

| Example | Wt. gsm | Outer Layer 1 Description | Wt. gsm | Intermed. Layer 3 Description | Wt. gsm | Outer Layer 2 Description | Total Wt. gsm | Caliper mm | Air Perm cm3/ cm2/ sec | MD Tensile kg/ 5 cm | CD Tensile kg/ 5 cm | KOH Wicking (mm) | KOH Retentivity (%) | Bubble Point microns | Mean Pore microns |
|---|---|---|---|---|---|---|---|---|---|---|---|---|---|---|---|
| 1 | 10 | PP Meltblown* | 25 | PE/PP Wet Laid* | 10 | PP Meltblown* | 47.3 | 0.15 | 17.4 | 10.8 | 5.9 | 80 | 301 | 22.4 | 12.7 |
| 2 | 46 | PP Meltblown Liquid Barrier | 25 | PE/PP Wet Laid* | 50 | PP Meltblown* | 121 | 0.257 | 1 | 16 | 8.5 | 118 | 156 | 9.8 | 4.2 |
| 3 | 20 | PP | 25 | PE/PP | 5 | PP | 49 | 0.133 | 23.5 | 10.8 | 4.7 | 41 | 109 | 52.3 | 30 |

TABLE 1-continued

Trilaminate Physical Data & Description

| Example | Wt. gsm | Outer Layer 1 Description | Wt. gsm | Intermed. Layer 3 Description | Wt. gsm | Outer Layer 2 Description | Total Wt. gsm | Caliper mm | Air Perm cm3/cm2/sec | MD Tensile kg/5 cm | CD Tensile kg/5 cm | KOH Wicking (mm) | KOH Retentivity (%) | Bubble Point microns | Mean Pore microns |
|---|---|---|---|---|---|---|---|---|---|---|---|---|---|---|---|
| 4 | 10 | Thermalbond PP Meltblown* | 15 | Wet Laid PP Spunbond | 30 | Meltblown* PE/PP Wet Laid* | 55 | 0.115 | 12.4 | 16 | 7 | 35 | 125 | 39 | 21 |
| 5 | 5 | PP Meltblown PE/PP | 25 | PE/PP Wet Laid* | 10 | PP Meltblown* | 42 | 0.095 | 11.5 | 8.9 | 5.3 | 76 | 146 | 255 | 14.3 |
| 6 | 30.5 | PP Netting | 21 | PE/PP Wet Laid* | 10 | PP Meltblown* | 57.6 | 0.176 | 31 | 12.6 | 10.3 | 105 | 228 | 25.3 | 13.6 |

PP = polypropylene
PE = polyethylene
*Polymer contains wettable melt additive
Example 2 has a hydrostatic head of 26 cm As shown in the drawing FIGURE, the laminate includes outer layers 1 and 2 and an intermediate layer 3 located therebetween. The product of Example 1 was designed to promote wicking of the electrolyte. All three layers of the laminated battery separator are formed from fibers containing a hydrophilic melt additive, and both outer layers are meltblown webs. Example 2 was designed with a relatively heavy basis weight hydrophilic meltblown on one outer surface, and this outer layer together with the intermediate wet laid layer function as an electrolyte reservoir. The opposite outer surface is formed from a relatively heavy basis weight hydrophobic meltblown web and serves as a liquid barrier. The laminated separator has hydrostatic head of 26 cm. Example 3 is a laminated construction designed to provide higher MD tensile strength. The crimped staple fiber contained in the thermal bond layer, coupled with the thermal bond pattern of the layer contribute to providing flow channels within the separator material. The laminate of Example 4 is designed for enhanced strength while maintaining sufficient electrolyte wicking and retention. The laminate of Example 5 has limited hydrophobic properties on one surface and hydrophilic properties on the opposite surface. The laminate of Example 6 utilizes a polypropylene netting material for strength and to provide channels in the machine direction contributing to enhanced gas transport within the separator material.

A further example of a multi-layer nonwoven laminate structure is a trilaminate structure including PP Meltblown outer layer containing a durable hydrophilic melt additive, a wet-laid inner layer of PE/PP sheath/core bicomponent fibers in which the PE sheath component contains a durable hydrophilic melt additive, and an outer layer of wet-laid nylon fibers. This laminate exemplifies how two different kinds of fibers can be incorporated into different layers. One surface layer is formed of wet laid web of nylon fibers, while the opposite surface is formed of hydrophilic polypropylene meltblown fibers. Still another example is a trilaminate structure in which all three layers contain a durable hydrophilic melt additive, and arranged as follows: two wet-laid outer layers of PE/PP bicomponent fibers containing hydrophilic melt additive in the PE sheath component on opposite sides of a middle layer of PP meltblown fibers containing a hydrophilic melt additive.

Examples 7 and 8 illustrate products that are similar to Example 1, but differ in weight. Additional test data illustrating the utility of these materials for battery separators are available for these samples: KOH absorbency under pressure (which measures electrolyte retention under compression, such as would be found in a cell), ionic resistance (measures resistance to ion flow through electrolyte saturated separator), and hi-pot (resistance to shorting).

Preferably, nonwoven materials of the present invention intended for use as battery separators have the following physical properties:

hi-pot greater than 400 volts, and desirably greater than 500 volts;

ionic resistance less than 25 ohm-cm, more desirably less than 20 ohm-cm, and most preferably less than 15 ohm-cm; and absorbency at 100 psi (690kPa) between 0.50 and 0.70 g/cm$^3$ Example 9 illustrates how a conventional grafting technology can be utilized in one of the layers in another embodiment of the invention. In this case, one outer layer contains acrylic acid grafted polypropylene. Similarly, a sulfonated or fluorinated fabric could be used as one of the layers.

The use of acrylic acid grafted or sulfonated polyolefin fabric as a separator is known to provide better self-discharge performance in a cell. It is thought that the grafted functional groups on the surface of these fabrics are able to capture trace metal ion and ammonia contaminants present in the positive electrode. These contaminants could migrate through a non-grafted separator and "poison" the surface of the negative electrode. Ammonia absorption capacity of the fabrics of examples 7 and 9 was measured by the following test: each fabric was soaked in 31% KOH containing 0.1M ammonium nitrate for 12 hours, then thoroughly rinsed in distilled water and dried. The amount of nitrogen absorbed by the fabric is then measured by the Kjeldahl method. Example 9, containing a grafted layer is seen to absorb 17 times as much nitrogen as Example 7. The Kjeldahl method is a well-known method for determining nitrogen content. The method involves treating the sample with concentrated $H_2SO_4$, $KMnO_4$, and $HClO_4$ to convert the nitrogen into ammonium sulfate. The solution is diluted, excess alkali is added and the ammonia formed is distilled into a known quantity of standard acid. The amount of ammonia generated is determined by titrating the excess acid.

According to the present invention, melt additives containing anionic functional groups, such as —$COO^-$, —$SO_4^=$, —$SO_3^=$, —$PO_4^{-3}$, —$CO_3^=$, can be used to provide the same kind of improved self-discharge performance in polyolefin fabrics at lower cost than grafting. The melt additive can be incorporated in one or more of the laminate layers. An example of a melt additive that provides both hydrophilic and anionic functionality is Sylvadym® dimer acid, commercially available from Arizona Chemical Company.

TABLE 2

|  | Example 7 | Example 8 | Example 9 |
|---|---|---|---|
| Outer Layer 1 | 10 gsm PP meltblown* | 15 gsm PP meltblown* | 10 gsm PP meltblown* |
| Intermediate Layer | 20 gsm PE/PP Wetlaid* | 28 gsm PE/PP Wetlaid* | 20 gsm PE/PP Wetlaid* |
| Outer Layer 2 | 10 gsm PP meltblown* | 15 gsm PP meltblown* | 55 gsm PP Spunbond** |
| Basis Wt., g/m$^2$ | 40.0 | 58.0 | 85 |
| Caliper, mm | 0.14 | 0.15 | 0.21 |
| Air Perm, cm$^3$/cm$^2$/sec | 22.0 | 5.0 | 5.0 |
| Bubble Pt, μ | 27 | 14 | 16.5 |
| Mean Pore Size, μ | 18 | 8 | 9 |
| MD Tensile, kg/50 mm | 9.3 | 16.1 | 29.6 |
| CD Tensile, kg/50 mm | 4.3 | 6.9 | — |
| KOH Wicking, mm | 84 | 69 | 96 |
| KOH Retentivity, % | 351 | 203 | 134 |
| Absorb at 100 psi, g/cm$^3$ | 0.62 | 0.53 | 0.61 |
| Ionic resistance, ohm-cm | 10.9 | 12.8 | 12.2 |
| Hi pot, volts | 559 | 782 | 1114 |
| Ammonia absorption (% N) | .009 | — | .16 |

*Polymer contains wettable melt additive
**Spunbond surface grafted with acrylic acid Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A laminate nonwoven material comprising:
    a first layer formed of meltblown nonwoven fibers defining a first surface of the laminate;
    a second layer formed of meltblown nonwoven fibers defining the opposite surface of the laminate; and
    an intermediate third layer of wetlaid nonwoven fibers located between said first and second layers, the layers and bonded to said first and second layers to form a laminate, said third layer produced from a blend of hydrophobic and hydrophilic fibers;
    at least one of said first and third layers comprising permanently hydrophilic fibers formed of a normally hydrophobic polypropylene polymer having a hydrophilic melt additive which are melt blended therein, so as to produce a web that is able to maintain its ability to stay wet after two three-hour exposures intervals at 31% KOH at 60 degree C.

2. The material of claim 1, wherein said hydrophobic melt additive comprises at least one member selected from the group consisting of monomer or dimmer fatty acids having a carbon chain length in the range of 6 to 50, hydroxy phenols, polyethylene glycol, polyvinyl alcohol, and polyvinyl formal.

3. The material of claim 1, including a plurality of discrete thermal point bonds fusing together fibers of said first, second and third layer to form an integral unitary laminate.

4. The material of claim 1, wherein said first, second and third layers comprise permanently hydrophilic meltblown fibers formed of a normally hydrophobic polypropylene polymer having a hydrophilic melt additive incorporated therein, said melt additive containing at least 20% by weight of the hydrophilic melt additive.

5. The material of claim 1, wherein said intermediate third layer of wet-laid nonwoven fiber includes sheath core bicomponent fibers having a polypropylene core and a polyethylene sheath.

6. The material as defined in claim 1, wherein said intermediate third layer contains binder fibers having a melting point lower than that of the fibers of other layers of the laminate.

7. A battery separator formed from the material of claim 1.

8. Filtration media formed from the material of claim 1.

9. The material of claim 1, having hi-pot greater then 400 volts, an ionic resistance less then 25 ohm-cm; and a n absorbency at 100 psi between 0.50 and 0.70 g/cm$^3$.

10. A laminate nonwoven material comprising:
    a first layer formed of meltblown nonwoven fibers defining a first surface of the laminate;
    a second layer formed of spunbond nonwoven fibers defining the opposite surface of the laminate; and
    an intermediate third layer of wetlaid nonwoven fibers located between said first and second layers, the layers and bonded to said first and second layers to form a laminate, said third layer produced from a blend of hydrophobic and hydrophilic fibers;
    at least one of said first and third layers comprising permanently hydrophilic fibers formed of a normally hydrophobic polypropylene polymer having a hydrophilic melt additive which are melt blended therein, so as to produce a web that is able to maintain its ability to stay wet after two three-hour exposures intervals at 31% KOH at 60 degree C.; and
    at least one of said first and second layers contains acrylic acid grafted polypropylene.

11. The material of claim 10 wherein at least one of said first and second layer has an ammonia absorption capacity of 0.16% nitrogen, wherein the nitrogen is measured by using a series of steps to convert nitrogen to ammonia, the steps comprising (a) treating a sample with concentrated sulfuric acid ($H_2SO_4$), potassium permanganate ($KMnO_4$), and perchloric acid (HClO$_4$), to convert nitrogen into ammonium sulfate (b) diluting the solution and adding excess alkali, (c) distilling the ammonia that is formed into a standard acid and (d) determining the amount of ammonia generated by titrating the excess acid.

12. The material as defined in claim 10, wherein said intermediate third layer contains binder fibers having a melting point lower than that of the fibers of other layers of the laminate.

13. The material of claim 10, wherein said hydrophobic melt additive comprises at least one member selected from the group consisting of monomer or dimmer fatty acids having a carbon chain length in the range of 6 to 50, hydroxy phenols, polyethylene glycol, polyvinyl alcohol, and polyvinyl formal.

14. The material of claim 10, including a plurality of discrete thermal point bonds fusing together fibers of said first, second and third layer to form an integral unitary laminate.

15. The material of claim 10, wherein said first, second and third layers comprise permanently hydrophilic meltblown fibers formed of a normally hydrophobic polypropylene polymer having a hydrophilic melt additive incorporated therein, wherein said melt additive containing at least 20% by weight of the active material.

16. The material of claim 10, wherein said intermediate third layer of wet-laid nonwoven fiber includes sheath core bicomponent fibers having a polypropylene core and a polyethylene sheath.

17. A battery separator formed from the material of claim 10.

18. Filtration media formed from the material of claim 10.

19. The material of claim 10, having hi-pot greater then 400 volts, an ionic resistance less then 25 ohm-cm; and an absorbency at 100 psi between 0.50 and 0.70 g/cm$^3$.

* * * * *